United States Patent
Shibutani

(10) Patent No.: US 7,280,743 B2
(45) Date of Patent: Oct. 9, 2007

(54) DATA RECORDING APPARATUS FOR RECORDING STREAM DATA IN WHICH DUMMY DATA IS INSERTED AND DATA RECORDING APPARATUS FOR RECORDING END CODE IN PLACE OF DUMMY CODE

(75) Inventor: Manabu Shibutani, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1111 days.

(21) Appl. No.: 10/281,101

(22) Filed: Oct. 28, 2002

(65) Prior Publication Data
US 2003/0091330 A1 May 15, 2003

(30) Foreign Application Priority Data
Nov. 9, 2001 (JP) ............... 2001-345304

(51) Int. Cl.
*H04N 7/26* (2006.01)
*H04N 5/00* (2006.01)

(52) U.S. Cl. ............... 386/111; 386/112; 386/125; 386/126

(58) Field of Classification Search ........ 386/125–126, 386/52, 82, 97, 111–112
See application file for complete search history.

(56) References Cited
U.S. PATENT DOCUMENTS 5,572,333 A * 11/1996 Moriyama et al. ............. 386/98
6,505,964 B1 * 1/2003 Ando et al. .................... 368/98
6,553,180 B1 * 4/2003 Kikuchi et al. ............... 386/95
6,574,422 B1 * 6/2003 Kikuchi et al. ............. 386/105
7,136,574 B2 * 11/2006 Ando et al. .................... 386/95
2001/0002851 A1 * 6/2001 Shimada et al. ......... 348/423.1
2003/0091342 A1 5/2003 Shibutani et al.
2003/0113097 A1 6/2003 Shibutani

FOREIGN PATENT DOCUMENTS

| EP | 0 929 072 A2 | 7/1999 |
| EP | 0 971 535 A2 | 1/2000 |
| EP | 1 052 644 A1 | 11/2000 |
| EP | 1 065 665 A1 | 1/2001 |
| JP | 6-178288 | 6/1994 |
| JP | 9-331524 | 12/1997 |
| JP | 09-331524 A | 12/1997 |
| JP | 2000-78531 | 3/2000 |
| JP | 2000-078531 A | 3/2000 |
| JP | 2001-169246 | 6/2001 |

OTHER PUBLICATIONS

Office Action, mailed Apr. 27, 2004, from the Japanese Patent Office for Patent Application No. 2001-345304.

* cited by examiner

*Primary Examiner*—Thai Q. Tran
*Assistant Examiner*—Daquan Zhao
(74) *Attorney, Agent, or Firm*—Pillsbury Winthrop Shaw Pittman, LLP

(57) ABSTRACT

A recording apparatus according to an aspect of this invention has an insertion unit configured to insert dummy data at a predetermined position of stream data, and a recording unit configured to record the stream data in which the dummy data is inserted on a recording medium.

2 Claims, 5 Drawing Sheets

| Field | Number of bytes | Value | Comment |
|---|---|---|---|
| packet_start_code_prefix | 3 | 00 00 0th | |
| stream_id | 1 | 1011 111b | Private_stream_2 |
| PES_packet_length | 2 | 07D4h | |
| | | Private data area | |
| sub_stream_id | 1 | 0101 000b | |
| RDI_GI | 16 | RDI_GI/DCI_CCI | |
| DDI_CCI | 8 | | |
| MNF_ID | 32 | MNFI(1979byte) | |
| VERSION | 2 | 0100h | Version 1.0 |
| SEC_DUMMY_flag | 1 | 0000 000*b | Flag indicating of dummy data for Sequence End Code is inserted |
| SEC_DUMMY_UNIT | 1 | 0000 00**b | Indicating insertion unit of dummy data for Sequence End Code<br>00b: Reserved<br>01b: GOP Unit<br>10b: Referance Picture Unit<br>11b: Reserved |
| reserved | 1943 | | |

FIG. 2

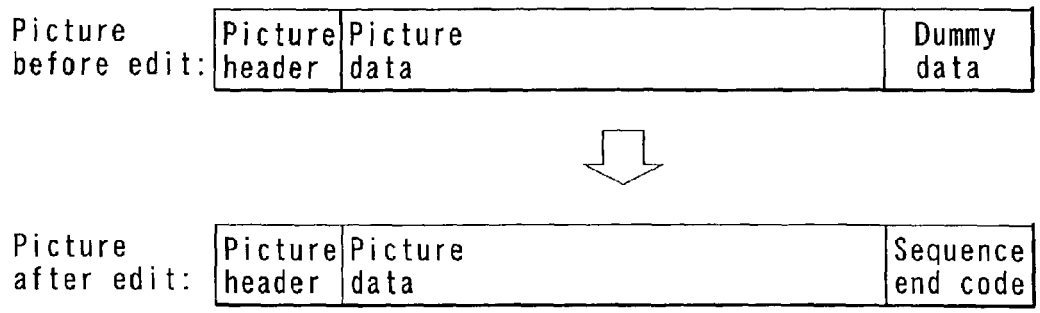
FIG. 5
| Field | Number of bytes | Value | Comment |
|---|---|---|---|
| start_code_prefix | 3 | 00 00 01h | |
| start_code_value | 1 | 1011 0111b | sequence_end_code |
FIG. 6
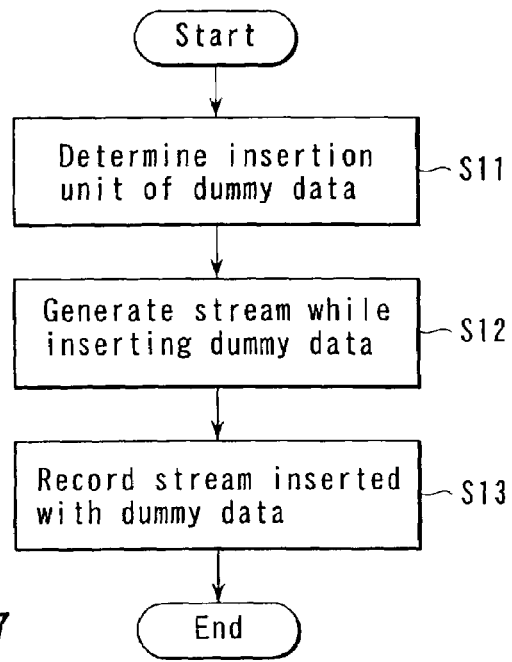
FIG. 7

DATA RECORDING APPARATUS FOR RECORDING STREAM DATA IN WHICH DUMMY DATA IS INSERTED AND DATA RECORDING APPARATUS FOR RECORDING END CODE IN PLACE OF DUMMY CODE

CROSS-REFERENCE TO RELATED APPLICATIONS

This application is based upon and claims the benefit of priority from the prior Japanese Patent Application No. 2001-345304, filed Nov. 9, 2001, the entire contents of which are incorporated herein by reference.

BACKGROUND OF THE INVENTION

1. Field of the Invention

The present invention relates to an MPEG stream data recording apparatus for recording and editing MPEG stream data.

2. Description of the Related Art

In recent years, recording apparatuses for recording MPEG stream data have been extensively studied and developed. The MPEG stream data has a plurality of successive GOPs (Group of Picture). Furthermore, the MPEG stream data has an SEC (Sequence End Code) which follows the last one of these plurality of successive GOPs.

By edit processes of MPEG stream data such as deletion of its latter half, extraction of some data, and the like, edited stream data may be formed of some of stream data before edit. As a result, the SEC is often not appended to the end of the edited stream data. Upon playing back such edited stream data, the last frame of the stream data cannot be played back.

BRIEF SUMMARY OF THE INVENTION

It is an embodiment of the present invention to provide a stream data recording apparatus for recording stream data having a data structure which is suitable for an edit process.

A recording apparatus according to an aspect of the present invention have the following arrangements.

A recording apparatus according to an aspect of the present invention comprises an insertion unit configured to insert dummy data at a predetermined position of stream data, and a recording unit configured to record the stream data in which the dummy data is inserted by the insertion unit on a recording medium.

Additional embodiments and advantages of the invention will be set forth in the description which follows, and in part will be obvious from the description, or may be learned by practice of the invention. The embodiments and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 shows an example of the data structure of an RDI packet in the DVD-VR standards;

FIG. 5 shows an example of the data structure near one picture in MPEG stream data in which dummy data is inserted for each picture, and an example of the data structure near one picture in MPEG stream data in which one item of dummy data is replaced by an SEC by an edit process;

FIG. 6 shows an example of the format of an SEC;

FIG. 7 is a flowchart for explaining an MPEG stream data recording process; and

DETAILED DESCRIPTION OF THE INVENTION

An embodiment of the present invention which can implement the aforementioned points will be described below with reference to the accompanying drawings.

Figure 1:
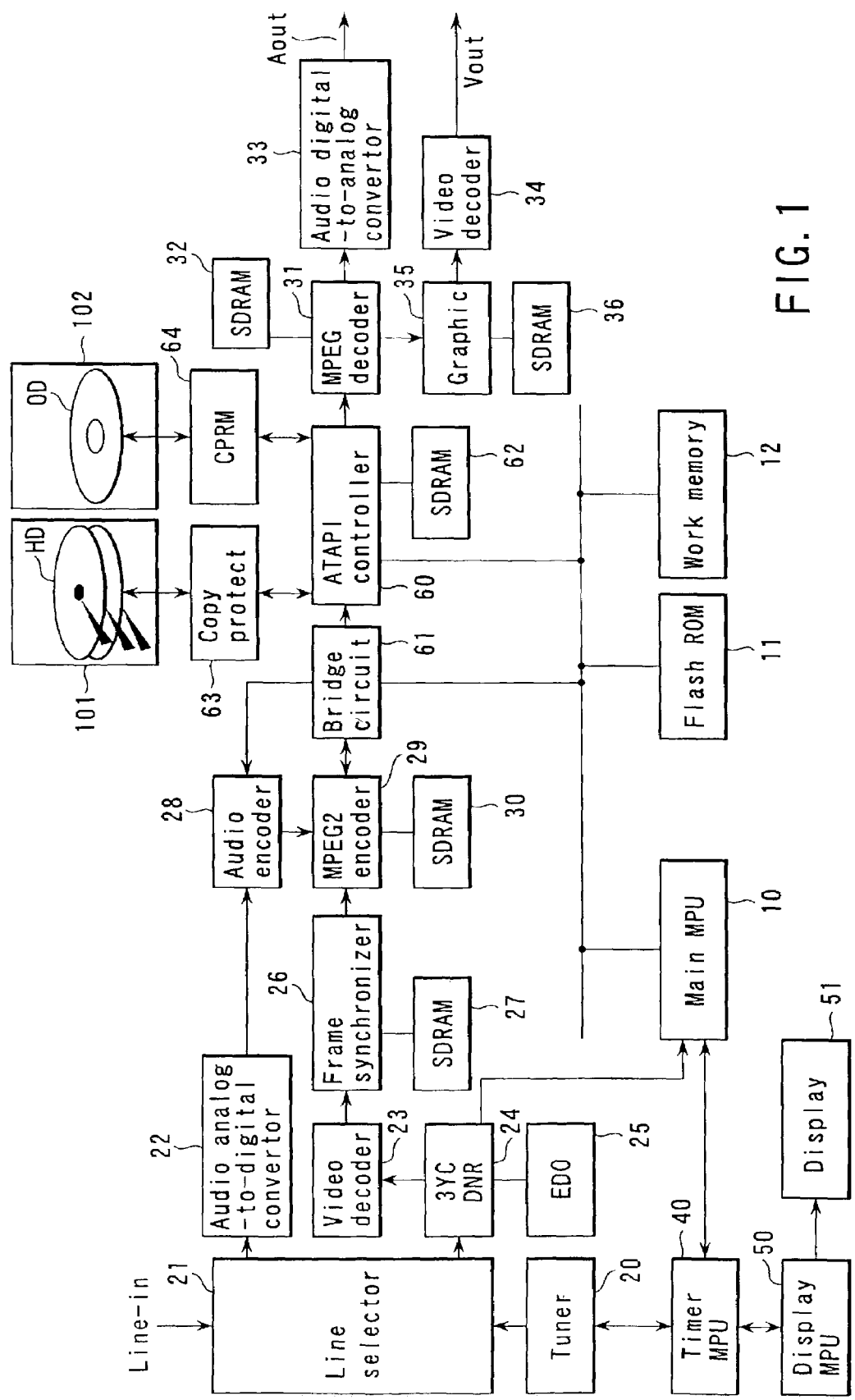
FIG. 1 is a schematic block diagram showing the arrangement of an MPEG stream data recording apparatus according to an embodiment of the present invention.

FIG. 1 shows a schematic arrangement of an MPEG stream data recording apparatus (to be simply referred to as a recording apparatus hereinafter) according to an embodiment of the present invention. This recording apparatus has a recording function and edit function. This recording apparatus inserts dummy data (=insignificant data) at predetermined positions of MPEG stream data and records the MPEG stream data in which the dummy data has been inserted on a predetermined recording medium by its recording function. This recording apparatus plays back MPEG stream data into which dummy data has been inserted from a predetermined recording medium, and edits this MPEG stream data by its edit function. Upon editing the MPEG stream data, the recording apparatus inserts significant data in place of dummy data contained in the MPEG stream data as needed. The recording apparatus records the MPEG stream data in which the significant data is inserted in place of dummy data on a predetermined recording medium as edited MPEG stream data. The significant data corresponds to, e.g., an SEC.

The recording apparatus shown in FIG. 1 comprises a main MPU 10, flash ROM 11, work memory 12, tuner 20, line selector 21, audio analog-to-digital converter 22, video decoder 23, 3YCNDR 24, EDO 25, frame synchronizer 26, SDRAM 27, audio encoder 28, MPEG2 encoder 29, SDRAM 30, MPEG decoder 31, SDRAM 32, audio digital-to-analog converter 33, video decoder 34, graphic circuit 35, SDRAM 36, timer MPU 40, display MPU 50, display 51, ATAPI controller 60, bridge circuit 61, SDRAM 62, copy protect 63, and CPRM 64.

The operation of the overall recording apparatus is controlled by the main MPU 10. The main MPU 10 is connected to the flash ROM 11 and work memory 12 via a data bus. An input terminal (line-in) and the tuner 20 are connected to the line selector 21. The tuner 20 is connected to the timer MPU 40. The timer MPU 40 controls the operation of the tuner 20. The timer MPU 40 is also connected to the display MPU 50, which is connected to the display 51. The timer MPU 40 and display MPU 50 control the operation of the display 51.

A signal output from the line selector 21 is input to the audio analog-to-digital converter 22 and 3YCDNR 24. An audio signal output from the audio analog-to-digital converter 22 is input to the audio encoder 28. The audio encoder 28 encodes the input audio signal, and outputs the encoded audio signal to the MPEG2 encoder 29. The SDRAM 30 is connected to the MPEG2 encoder 29. The EDO 25 is connected to the 3YCDNR 24. A signal output from the 3YCDNR 24 is input to the video decoder 23. A signal output from the video decoder 23 is input to the frame synchronizer 26. The SDRAM 27 is connected to the frame synchronizer 26. A frame signal output from the frame synchronizer 26 is input to the MPEG2 encoder 29.

The MPEG2 encoder 29 encodes the input signal. With this encoding, for example, MPEG stream data is generated. The MPEG stream data generated by the MPEG2 encoder 29 is output to the bridge circuit 61. The bridge circuit 61 outputs the input MPEG stream data to the ATAPI controller 60. The SDRAM 62 is connected to the ATAPI controller 60. The ATAPI controller 60 outputs the MPEG stream data to a disk drive 101 via the copy protect 63 or to a disk drive 102 via the CPRM 64.

The disk drive 101 records MPEG stream data on a hard disk HD and reads out MPEG stream data recorded on the hard disk HD. The disk drive 102 records MPEG stream data on an optical disk OD and reads out MPEG stream data recorded on the optical disk OD.

The MPEG stream data read out from the disk is input to the MPEG decoder 31 via the ATAPI controller 60. The SDRAM 32 is connected to the MPEG decoder 31. The MPEG decoder 31 decodes the MPEG stream data, and outputs decoded data to the audio digital-to-analog converter 33 and graphic circuit 35. The audio digital-to-analog converter 33 outputs an audio signal contained in the MPEG stream data. The SDRAM 36 is connected to the graphic circuit 35. A graphic signal output from the graphic circuit 35 is input to the video decoder 34. The video decoder 34 outputs a video signal.

The recording function and edit function of the aforementioned recording apparatus will be described in more detail below.

The role of dummy data will be described below. Upon recording MPEG stream data, the main MPU 10 checks if that stream data is likely to be edited, so as to determine if dummy data is to be recorded for insertion of an SEC in the future. In some cases, the main MPU 10 must determine the recording unit of dummy data.

The MPEG stream data has a plurality of successive GOPs, and also an SEC which follows the last one of the plurality of successive GOPs. FIG. 6 shows an example of the SEC format. Each of these GOPs has a plurality of successive pictures (for, e.g., 15 frames). Normally, a stream is cut by the edit process at each GOP. However, stream data can be edited for each frame depending on the edit performance of the recording apparatus. This is because the stream can be directly segmented between a given picture present before a reference picture, and that reference picture in accordance with the picture configuration contained in MPEG.

After a recording unit is determined, the main MPU 10 informs the MPEG2 encoder 29 of the presence/absence of necessity of insertion of dummy data, and its insertion unit. Upon receiving a recording start command from the main MPU 10, the MPEG2 encoder 29 that has received the information generates MPEG stream data while inserting dummy data for respective determined units in accordance with the informed condition. The generated MPEG stream data is provided to the disk drive 101 or 102 via the bridge circuit 61 and ATAPT controller 60. The disk drive 101 records the MPEG stream data on the hard disk HD. The disk drive 102 records the MPEG stream data on the optical disk OD.

Figure 4:
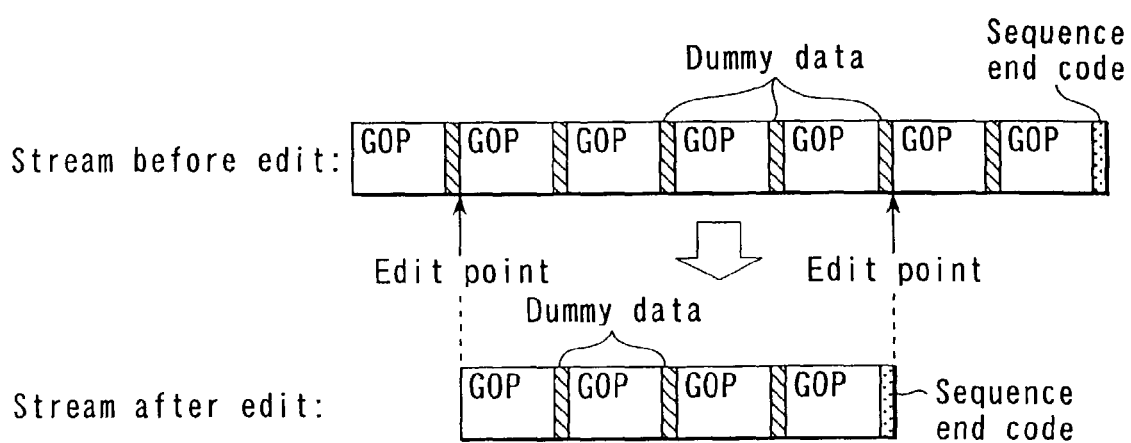
FIG. 4 shows an example of the data structure of MPEG stream data in which dummy data is inserted for respective GOPs, and an example of the data structure of MPEG stream data in which one of dummy data is replaced by an SEC by an edit process.

Each item of dummy data is inserted after, e.g., each GOP, as shown in FIG. 4 (see "stream before edit"). Strictly speaking, dummy data is inserted after respective GOPs except for the last GOP of those contained in the MPEG stream data. Or each item of dummy data is inserted after, e.g., each picture, as shown in FIG. 5 (see "picture before edit"). Strictly speaking, dummy data is inserted after respective pictures except for the last picture of a plurality of pictures contained in the last GOP.

Also, each item of dummy data is data of all "0"s. For example, 4 bytes or more of data 0X00(equal to or larger than the number of bytes which form an SEC) are inserted as dummy data at a predetermined position of MPEG stream data. Such dummy data is considered as some bytes of an immediately preceding picture in the standards and upon processing in the decoder, and does not influence playback. The reason why the number of bytes that form dummy data is set to be equal to or larger than the number of bytes that form an SEC is that the SEC may be inserted in place of dummy data in the future.

The recording apparatus records presence information of dummy data indicating if dummy data is inserted in MPEG stream data, and insertion unit information of dummy data indicating the insertion unit of dummy data on a recording medium (hard disk HD, optical disk OD). Upon editing MPEG stream data by the edit function of the recording apparatus, dummy data can be used as needed based on such information.

The recording positions (part 1) of the presence information and insertion unit information of dummy data will be explained below with reference to FIG. 2. FIG. 2 shows the data structure of an RDI packet in the DVD-VR standards.

An RDI pack is allocated at the head of each GOP contained in MPEG stream data. Furthermore, this RDI pack contains an RDI packet with the data structure shown in FIG. 2. For example, the aforementioned presence information and insertion unit information of dummy data are allocated in MNFI of RDI_PCK, as shown in FIG. 2. SEC_DUMMY_Flag shown in FIG. 2 corresponds to the presence information of dummy data, and SEC_DUMMY_UNIT corresponds to the insertion unit information of dummy data. The presence information of dummy data indicates if dummy data is inserted. The insertion unit information of dummy data indicates the insertion unit of dummy data. That is, this information indicates if dummy data is inserted for each GOP or each reference picture. Note that the MPEG2 encoder 29 records the presence information and insertion unit information in MNFI of RDI_PCK (in an area in a stream that does not influence playback).

Figure 3:
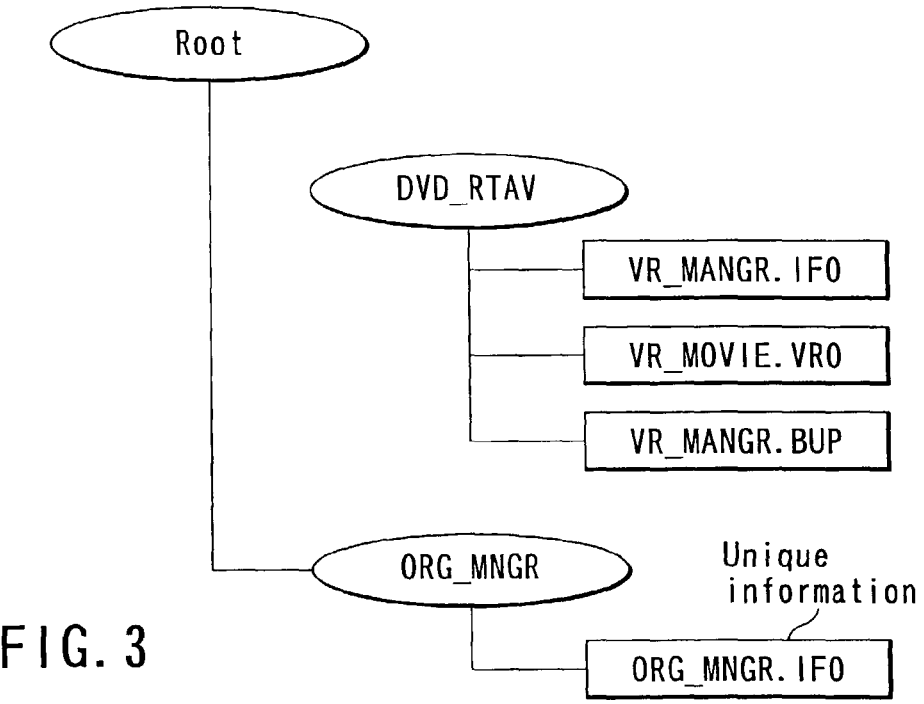
FIG. 3 shows an example of the file structure of the DVD-VR standards.

Subsequently, the recording positions (part 2) of the presence information and insertion unit information of dummy data will be explained below with reference to FIG. 3. FIG. 3 shows an example of the file structure of the DVD-VR standards.

As shown in FIG. 3, directories named DVD_RTAV and ORG_MNGR are allocated on a recording medium. Files named VR_MANGR.IFO, VR_MOVIE.VRO, and VR_MANGR.BUP are allocated under DVD_RTAV. A file named ORG_MANGR.IFO is allocated under ORG_MANGR. Unique information can be freely written in ORG_MANGR.IFO. MPEG stream data is allocated in VR_MOVIE.VRO. The aforementioned presence information and insertion unit information of dummy data are allocated in ORG_MANGR.IFO. That is, unlike in the case described using FIG. 2, the presence information and insertion unit information of dummy data are allocated in a file independent from a stream. Note that the main MPU 10 forms a file, and records the presence information and insertion unit information of dummy data as a file on the hard disk HD or optical disk OD via the ATAPI controller 60.

The MPEG stream data recording process will be explained below with reference to the flowchart shown in FIG. 7. The main MPU 10 determines an insertion unit of dummy data (step 11). The MPEG2 encoder 29 generates MPEG stream data while inserting dummy data in accordance with the determined insertion unit of dummy data (step 12). That is, upon inserting dummy data for respective GOPs, a stream before edit shown in FIG. 4 is generated; upon inserting dummy data for respective pictures, a picture before edit shown in FIG. 5 is generated. The disk drive 101 or 102 records MPEG stream data into which dummy data has been inserted (a stream before edit shown in FIG. 4 or a picture before edit shown in FIG. 5) on the hard disk HD or optical disk OD (step 13).

Figure 8:
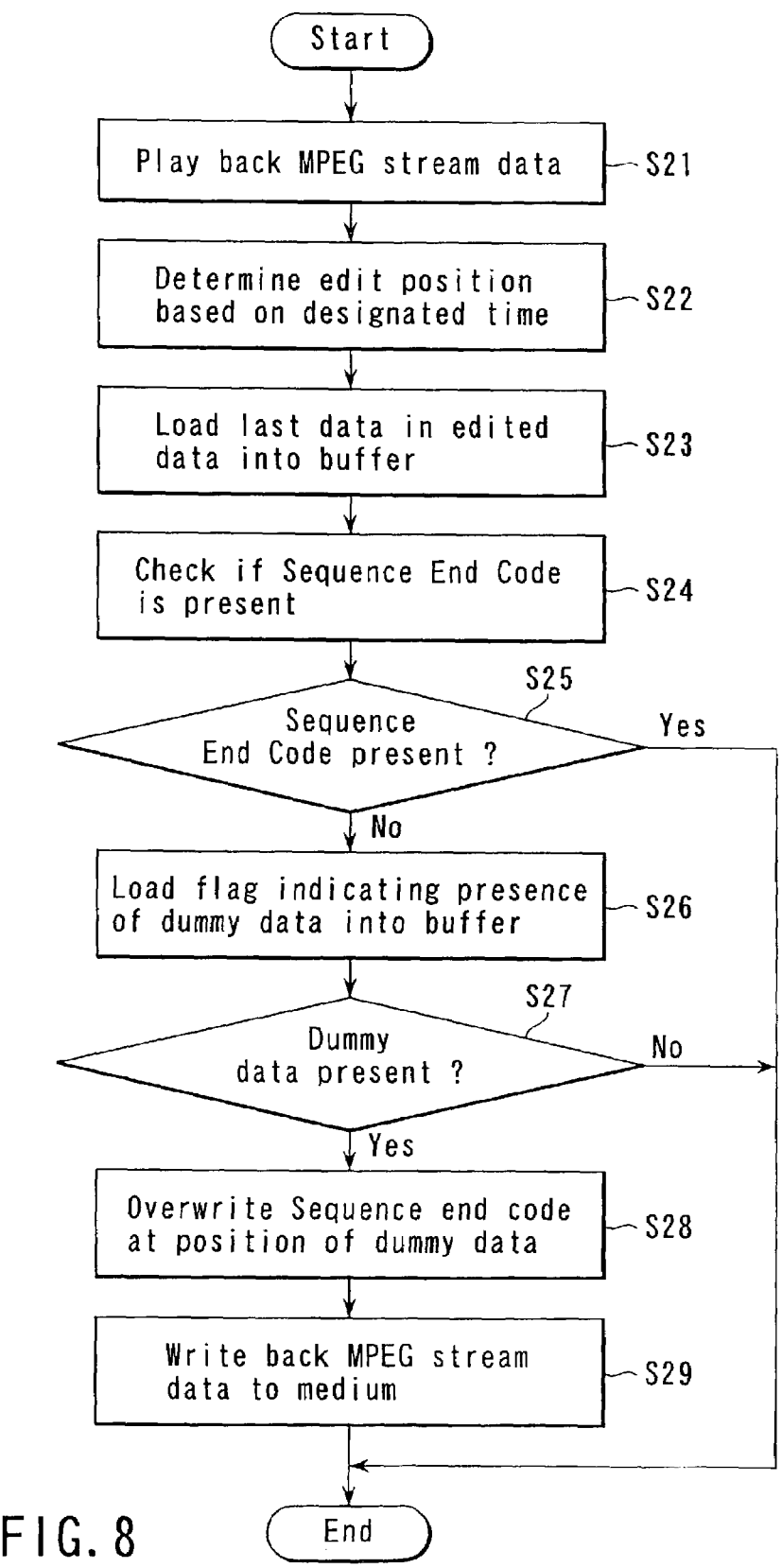
FIG. 8 is a flowchart for explaining an MPEG stream data edit process.

The MPEG stream data edit process will be explained below with reference to the flowchart shown in FIG. 8. The disk drive 101 or 102 of the recording apparatus plays back MPEG stream data from the hard disk HD or optical disk OD (step 21). Upon editing the MPEG stream data by the edit function of the recording apparatus (edit function under the control of the main MPU 10), the main MPU 10 determines a delete point (edit point) on the basis of a time designated by the user (step 22). After the delete point is determined, it is checked if an SEC is present after an objective picture (or objective GOP) located before this delete point. To attain this checking process, the main MPU 10 reads the objective picture (or objective GOP) and subsequent data of this objective picture (or objective GOP) from the hard disk HD or optical disk OD into the work memory 12, and analyzes if the SEC follows the objective picture (or objective GOP) (step 24).

If the SEC is already present (step 25, YES), since another SEC need not be inserted, the edit process ends. If no SEC is found (step 25, NO), the main MPU 10 searches whether dummy data follows the objective picture (or objective GOP), so as to insert the SEC. For this purpose, the main MPU 10 reads out the presence information of dummy data from the hard disk HD or optical disk OD, saves it in the work memory 12, and executes the above checking process (step 26).

If the main CPU 10 determines that dummy data that can be used to insert the SEC is inserted after the objective picture (or objective GOP) (step 27, YES), the main MPU 10 searches for subsequent data of the objective picture (or objective GOP), and overwrites the SEC at the position of the dummy data (step 28). That is, the SEC is inserted in place of the dummy data under the control of the main MPU 10. The MPEG stream data in which the SEC is inserted in place of dummy data is written back to the hard disk HD or optical disk OD by the disk drive 101 or 102 (step 29).

An edit process for each GOP of the aforementioned edit processes will be explained in more detail below with reference to FIG. 4. For example, when only one GOP, which is not the last GOP, of a plurality of successive GOPs contained in MPEG stream data is extracted by the edit process, the SEC is inserted in place of dummy data that follows the extracted GOP. When a plurality of GOPs, which do not include the last GOP, of a plurality of successive GOPs contained in MPEG stream data are extracted by the edit process, the SEC is inserted in place of dummy data, which follows the last GOP of the plurality of extracted GOPs (see "stream after edit" shown in FIG. 4).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording apparatus comprising:
   an insertion unit configured to insert dummy data at a predetermined position of stream data; and
   a recording unit configured to record the stream data in which the dummy data is inserted by said insertion unit on a recording mediums,
   wherein the stream data contains a plurality of successive GOPs (Group of Pictures), and an end code after a last GOP of the plurality of successive GOPs,
   each GOP contains a plurality of successive pictures,
   the dummy data comprises all "0"s and is not less than the number of bytes that form the end code,
   said insertion unit inserts the dummy data as some bytes of an immediately preceding picture after each GOP except for the last GOP, and
   said recording unit records presence information indicating the presence of dummy data in each GOP except for the last GOP.

2. A recording apparatus comprising:
   a playback unit configured to playback stream data recorded a recording medium;
   an edit unit configured to edit the stream data played back by said playback unit;
   an insertion unit configured to insert an end code in place of dummy data as some bytes of an immediately preceding picture after a last GOP (Group of Pictures) contained in the edited stream data on the basis of presence information indicating the presence of the dummy data contained in the last GOP; and
   a recording unit configured to record the edited stream data in which the end code is inserted, on a recording medium;
   wherein the stream data contains a plurality of successive GOPs, and the end code after a last GOP of the plurality of successive GOPs,
   each GOP contains a plurality of successive pictures, and
   the dummy data is data of all "0"s and not less than the number of bytes that form the end code.

* * * * *